(12) United States Patent
Abdolvand et al.

(10) Patent No.: US 11,752,662 B2
(45) Date of Patent: Sep. 12, 2023

(54) PROCESS AND DEVICE FOR PREPARING A 3-DIMENSIONAL BODY, IN PARTICULAR A GREEN BODY

(71) Applicant: Max-Planck-Gesellschaft zur Foerderung der Wissenschaften e.V., Munich (DE)

(72) Inventors: Amir Abdolvand, Erlangen (DE); Ralf Keding, Erlangen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 1017 days.

(21) Appl. No.: 16/499,251

(22) PCT Filed: Mar. 28, 2017

(86) PCT No.: PCT/EP2017/000375
§ 371 (c)(1),
(2) Date: Sep. 28, 2019

(87) PCT Pub. No.: WO2018/177495
PCT Pub. Date: Oct. 4, 2018

(65) Prior Publication Data
US 2020/0023548 A1    Jan. 23, 2020

(51) Int. Cl.
*B28B 1/00* (2006.01)
*C03B 19/06* (2006.01)
(Continued)

(52) U.S. Cl.
CPC .............. *B28B 1/001* (2013.01); *C03B 19/06* (2013.01); *C04B 35/111* (2013.01); *C04B 35/14* (2013.01);
(Continued)

(58) Field of Classification Search
CPC .......... B29B 1/001; B33Y 30/00; B33Y 80/00; B33Y 10/00
See application file for complete search history.

(56) References Cited

U.S. PATENT DOCUMENTS

| 4,575,330 A | 3/1986 | Hull |
|---|---|---|
| 5,120,444 A | 6/1992 | Clasen |

(Continued)

FOREIGN PATENT DOCUMENTS

| JP | H04-219326 A | 8/1992 |
|---|---|---|
| JP | 2004-323352 A | 11/2004 |
| WO | 9744291 A1 | 11/1997 |

OTHER PUBLICATIONS

Japanese Decision to Grant dated Jun. 28, 2022.
(Continued)

*Primary Examiner* — Nahida Sultana
(74) *Attorney, Agent, or Firm* — Caesar Rivise, PC

(57) ABSTRACT

The invention relates in a first aspect to a process for preparing a 3-dimensional body, in particular a vitreous or ceramic body, which comprises at least the following steps: a) providing an electrostatically stabilized suspension of particles; b) effecting a local destabilization of the suspension of particles by means of a localized electrical discharge between a charge injector and the suspension at a predetermined position and causing an aggregation and precipitation of the particles at said position; c) repeating step b) at different positions and causing the formation of larger aggregates until a final aggregate of particles representing a (porous) 3-dimensional body (green body) having predetermined dimensions has been formed; wherein the charge injector includes i) at least one discharge electrode which does not contact said suspension of particles or ii) a source of charged particles. A second aspect of the invention relates to a device, in particular for performing the above process,
(Continued)

Device 1

Device 2 comprising at least the following components: —a vessel for receiving an electrostatically stabilized suspension of particles, —a charge injector, in particular including one or more electrodes or a source of high-energy charged particles, —means for moving the electrode and/or the vessel in the x, y and z directions, —a counter electrode arranged in the vessel for a contact with the suspension of particles, —one or more sensors for determining geometrical and physical parameters within said vessel. In one preferred embodiment, said device further comprises a means for directing a beam of gas-ionizing radiation, in particular a laser beam, to a predetermined position within the vessel.

25 Claims, 5 Drawing Sheets

(51) Int. Cl.
 C04B 35/111 (2006.01)
 C04B 35/14 (2006.01)
 C04B 35/443 (2006.01)
 C04B 35/46 (2006.01)
 C04B 35/565 (2006.01)
 C04B 35/581 (2006.01)
 C04B 35/584 (2006.01)
 C04B 35/626 (2006.01)
 B33Y 10/00 (2015.01)
 B33Y 30/00 (2015.01)
 B33Y 80/00 (2015.01)
(52) U.S. Cl.
 CPC ............ *C04B 35/443* (2013.01); *C04B 35/46* (2013.01); *C04B 35/565* (2013.01); *C04B 35/581* (2013.01); *C04B 35/584* (2013.01); *C04B 35/6263* (2013.01); *C04B 35/62625* (2013.01); *B33Y 10/00* (2014.12); *B33Y 30/00* (2014.12); *B33Y 80/00* (2014.12); *C04B 2235/3217* (2013.01); *C04B 2235/5427* (2013.01); *C04B 2235/5454* (2013.01); *C04B 2235/602* (2013.01); *C04B 2235/608* (2013.01); *C04B 2235/61* (2013.01); *C04B 2235/614* (2013.01); *C04B 2235/658* (2013.01); *C04B 2235/665* (2013.01); *C04B 2235/80* (2013.01)

(56) References Cited

U.S. PATENT DOCUMENTS

| 5,697,043 | A | 12/1997 | Baskaran et al. |
| 2002/0152768 | A1 | 10/2002 | Loxley et al. |
| 2004/0216486 | A1 | 11/2004 | Schwertfeger et al. |
| 2009/0095629 | A1 | 4/2009 | Wiest et al. |
| 2011/0168558 | A1* | 7/2011 | Fransaer ............... C09D 5/448 204/477 |
| 2017/0044680 | A1 | 2/2017 | Sundaram |

OTHER PUBLICATIONS

Clasen, "Preparation and Sintering of High-Density Green Bodies to High-Purity Silica Glasses", Journal of Non-Crystalline Solids, vol. 89, pp. 335-344 (1987).

Nold et al., "Electrophoretic deposition as rapid prototyping method", Journal of the European Ceramic Society, vol. 30, pp. 1163-1170 (2010).

Tabellion et al., "Manufacturing of pure and doped silica and multicomponent glasses from SiO2 nanoparticles by reactive electrophoretic deposition", J. Mater. Sci., vol. 41, pp. 8173-8180 (2006).

* cited by examiner

PROCESS AND DEVICE FOR PREPARING A 3-DIMENSIONAL BODY, IN PARTICULAR A GREEN BODY

CROSS-REFERENCE TO RELATED APPLICATIONS

This application is a U.S. National Phase Application of PCT/EP2017/000375, filed Mar. 28, 2017, the contents of which are incorporated herein by reference in their entireties for all purposes.

BACKGROUND OF THE INVENTION

The present invention relates to means for direct writing of free-form structures of various materials, in particular pure and doped glasses or ceramics, via a process akin to 3D-printing.

Additive manufacturing in general, or as is commonly named 3D-printing, and its related technique of selective laser melting (SLM) are recently evolved. It represents a very promising approach in the fields of material science and technology. These rely on selective melting and/or binding of a printing material in a powder form using the heat generated from a focused (laser) radiation or by selective injection of a binding material. By moving the focus point of the laser (or the binder's injection site) a two dimensional pattern can be produced. By repeating the same procedure in a layer-by-layer way a desired three dimensional shape emerges out of the powder. This method in principle offers almost full flexibility in the design and manufacturing of the products.

However, the known techniques of 3D-printing are not equally applicable to all kinds of materials. This applies in particular to two very interesting classes of material, namely, glasses with a special focus on $SiO_2$ and ceramics.

With its abundance and excellent properties, such as optical transparency, mechanical and thermal stability, durability, chemical inertness and non-toxicity which makes glass suitable for biomedical applications silica has been long identified as a material of choice for a wide range of applications, such as in optics and lighting, telecommunication and networks, photovoltaics and energy sector, medicine, display systems and electronics. Moreover due to its elegant and pleasant appearance glass is finding more and more usage in modern designs and architecture. Silica is also easily recyclable making it an ideal material for environmentally sustainable applications.

Technical ceramics are heavily used in areas such as high temperature applications, automotive industry, aeronautic and space applications, biomedical implants, and defence. In particular, excellent mechanical robustness of ceramic composites such as zirconia, aluminium oxides and zirconia toughened alumina, has made them the material of choice for structural applications such as cutting tools and biomedical implants and prostheses.

Traditionally, mainly metals and polymers have been used in 3D-printing applications. Most frequently used materials are polymers, with ABS (acrylonitrile butadiene styrene) and PLA (polylactic acid) plastics being the dominant ones. In most cases these are hot-extruded. This is because the 3D-printing process relies on the melting and subsequent solidification and binding of the material after processing via the heat generated from different sources, e.g. the laser radiation. For laser heating during the process, the printing material should absorb the wavelength of the laser. This requirement limits the choice of the materials for the laser-based 3D-printing. In particular, this poses a serious problem for laser-based 3D-printing of pure $SiO_2$, due to its wide transparency window and good transmission of most of the available laser emission wavelengths. This is also problematic for 3D-printing of ceramics which include non-absorbing components, such as $Al_2O_3$.

Consequently, laser-based 3D-printing of glass and ceramics has been mainly limited to hybrid compounds, i.e. glass or ceramics mixed with a suitable binding polymer, such as polymer-derived ceramics. However, 3D-printing of glass with a binding material using SLM technique results in opaque glass structures which lack optical transparency. The same applies for light induced cross-linking of a glass-filled polymer. In both cases of ceramics and glass, subsequent removal and separation of the binding material poses a challenge, often requiring time consuming and cumbersome post-processing procedures which in most cases do not allow 100% removal of the binding materials from the 3D-printed parts, thus limiting the usefulness of the technique. An alternative approach is to use a laser radiation which is absorbed by the glass and ceramic materials, e.g. a $CO_2$ laser with a radiation wavelength of 10 µm. However, in this case one ends up with a highly porous structure with low density. Beside the porosity, there is a formation of cracks due to the thermal shock in brittle materials in case of SLM in general. In addition, direct, local heat treatment of a glass powder results in the formations of bubble-containing glass and hence the material becomes heavily scattering, i.e. low optical quality. In the case of ceramics, local heating and subsequent sintering results in the crack formation as well. This heavily reduces the mechanical strength of ceramics and ceramic composites. As a result a technique for 3D-printing of compact, high density and transparent glass structures or ceramics is still lacking.

The main object underlying the present invention is to provide a novel and favourable means for direct writing of free-form structures of various materials, which are in particular applicable to pure and doped glasses or ceramics as well. This object is achieved by providing the process according to the invention.

DESCRIPTION OF THE INVENTION

The process for preparing a 3-dimensional body, in particular a vitreous or ceramic body, according to the present invention comprises at least the following steps:

a) providing an electrostatically stabilized suspension of particles;

b) effecting a local destabilization of the suspension of particles by means of a localized electrical discharge between a charge injector and the suspension at a predetermined position and causing an aggregation and precipitation of the particles at said position;

c) repeating step b) at different positions and causing the formation of larger aggregates until a final aggregate of particles representing a (porous) 3-dimensional body (green body) having predetermined dimensions has been formed;

wherein the charge injector includes i) at least one discharge electrode which does not contact said suspension of particles or ii) a source of charged particles.

In strong contrast to the conventional 3D-printing process where the printing material, generally a powder, fuses by the heat generated from a laser radiation, or requires a binding additive, normally a polymer often cross-linked via light, the "cold" process of the invention relies on direct binding of particles (originally in a powder form) without the need for a (laser) heat treatment or any major additional mainly organic binding material.

Nevertheless, this process still enables to retain the full control over the printed shapes and structures (which represents a major advantage of conventional 3d-printing).

The claimed process is based on a local manipulation of the electrostatic stabilisation of a suspension. In this technique the charge distribution of an electrostatically stabilised suspension of particles is locally perturbed by the action of either a local electrical discharge initiated by a charge injector which either includes an electrode (FIG. 1, left) or a stream of charged particles, for example ions or electrons (FIG. 1, right). This causes the particles to bind together by intrinsic cohesion or by adhesion between different kinds of particles.

For example, an electrostatically stabilized suspension of silica ($SiO_2$) particles in water may be obtained by adding a suitable amount of tetramethylammonium hydroxide (TMAH). In this case, the $SiO_2$ particles become negatively charged and repulse each other because of the coulomb forces. This avoids agglomeration and sedimentation of the particles and hence keep the suspension stable. If the surface charge is now neutralised, for example by initiating an electrical discharge from a positive electrode or by directly injecting a stream of positively charged particles, the stabilisation effect vanishes and results in the subsequent collapse of the suspension in a green body and residual liquid. The same can be done with positively charged suspension particles and an injection of negative charge or negatively charged particles.

The process of the present invention is also applicable to the preparation of a green body which comprises 2 or more components. This can be achieved by creating a stabilised suspension of both components, and providing conditions which enable the collapse of both components at the same time or result in a sufficient fast collapse of a main component which entrains a minor component, for example, metallic nanoparticles in the suspension as dopant, and, thus, avoids the separation of particles due to their composition.

By moving the location of the discharge either by moving the electrode (or steering the direction of the charged particles) or by moving the suspension itself in a xy plane, a 2D pattern—with a finite depth—of green body can be generated. By repeating the process of binding the particles in a layer-by-layer way, for example by moving the green body but not the electrode and the suspension level in the z direction or, alternatively, moving both the electrode and the suspension level but not the green body in the z direction, a connected, arbitrarily shaped 3D green body can be produced. The size of the green bodies produced can be large without a fundamental change in the process. The size is only limited by the mechanical stability of the green body, i.e. it should not deform under its own weight.

The process of the present invention differs significantly from the known process of electrophoretic deposition (EPD) as developed by Rolf Clasen and co-workers (see, e.g., US 2009/0095629 A1, Clasen, R., Journal of Non-Crystalline Solids, vol. 89, issue 3, pp. 334-344, Nold, Zeiner and Clasen, Journal of the European Ceramic Society 30 (2010), pp. 1163-1170). Similar to the approach of the invention, the starting point of EPD is an electrostatically stabilised suspension of (glass) particles. However, in contrast to the present invention, in this case two electrodes with opposite polarities are brought in direct contact with the suspension, causing the deposition of a packed layer of (e.g. glass) particles on one of the electrodes or a membrane between the electrodes. Which electrode the deposition takes place on depends on the type of the charge distribution immediately around the (glass) particles. For instance, in negatively charged (glass) particles (for example $SiO_2$ stabilised via TMAH) the layer is deposited on the positive electrode. The thickness of the layer formed in this way can be controlled by the applied voltage and the deposition duration time, i.e. the higher the voltage or the waiting time, the ticker the layer. In a layer-by-layer deposition case, deposition is performed on a movable membrane which is also used as a 2D template. In this way centimetre long structures could be deposited by gradually moving the membrane in the electrostatically stabilised suspension. The fundamental mechanism of the deposition on a membrane is the movement of the particles in the electric field gradient and a compression to a green body by mechanically overcoming the repulsing coulomb forces.

Drawbacks of this technique, which are overcome by the process of the present invention, include:
- Low spatial resolution.
- Low longitudinal extension due to sensitivity to the electric field gradient which puts a limit on how far away one can be from the membrane.
- Formation of bubbles due to electrophoresis which impairs the packing of the particles and affects the final product.
- A precipitation of an arbitrary shaped green body is limited by the membrane shape and the possible field gradients.

Generally, the present invention provides a number of major advantages over the state-of-the-art, based on the fact that the claimed process involves a contact-less, high resolution, electrostatic-based precipitation of a free-formed 3D green body from a suspension.

Being contact-less offers the following benefits:
High purity of the final material is guaranteed.
Arbitrary shapes can be written without being limited by the geometry of the electrodes as in EPD.
Resolution is not limited by electrode and membrane shape as in EPD, or local heat distribution as in SLM.
No electrolysis is present, thus no problems with electrolysis products, such as electrode corrosion or bubble formation, occur.

Resolution can be extremely high:
The resolution in selective laser melting is controlled by localised heating via the laser radiation. This provides a resolution far worse than the diffraction limited spot size produced by the laser radiation itself. The present invention provides a resolution of 10 nm to 1 mm, with typical values in the range of 1 µm to 100 µm, with the highest achievable resolution limited only by the size of the particles and thus being far beyond what can be obtained via normal laser-based 3D printing.
Focusing of electron/ion beams to extremely small spots is technologically solved. This is the base for a variety of commercially available devices such as scanning electron microscopes (SEM), or focused ion beam (FIB).

The method is electrostatic-based:
As a result small currents precipitate a large amount of material as one only needs to neutralise the surface charge. This makes the present technique more efficient than galvanic or electron beam precipitation from the gas phase, as the claimed method requires less energy deposition during the green body formation. This also has the advantage that said method has less problems with deformation and cracks.

The method is suspension-based:
Variation of the suspension parameters is easily possible.
Complex compositions can be stabilized in a suspension and precipitated without a need for modifying the method itself.
Particle composition and liquid composition are almost free to select.
Suspension preparation is well established in ceramic industry.
Multicomponent suspensions are possible via electrostatic surface charge stabilisation.
Addition of dopants to the suspension itself is straightforward.
Heat (energy) deposition during the green body precipitation is orders of magnitude smaller than in laser-melting:
No deformation or crack formation in the green body due to thermal shock.
No evaporation of the heat-sensitive dopants.
The amount of organic residuals in the green body is extremely small, and in many cases, e.g. TMAH, it evaporates completely via heating the 3D-printed structure even before the sintering of the particles starts:
No residuals like carbon or decomposition gasses disturb the properties of the final product.

Typically, the porous 3-dimensional body obtained by the steps a)-c) in claim 1, also denominated "green body" in the following text, is further densified in order to obtain a transparent and/or mechanically more stable body with most or all of the pores removed.

This may be effected by coalescing via the conventional approach of sintering of the green body: a subsequent temperature treatment and firing can sinter the green body to a dense body without having problems with decomposed organic components in the green body. This heat treatment reduces the porosity of a green body (from green body density of about 60% to final sinter density of better than 96%) and causes the green body to shrink. The sintering works for crystalline green bodies as well as for glassy green bodies. As shown in the literature for the case of green bodies of glass (doped or pure $SiO_2$) formed by other techniques, the sintering can result in a dense glass body with optical quality and transparency which is proven by EPD (Clasen et al., J. Mater Sci. (2006) 41:8173-8180).

The major problem with this approach is that it is complicated to control and in the case of a 3D-printed structure the changes in the dimension due to the shrinkage need to be known for obtaining the desired final structure. Additionally the sintering is a thermal process that is time consuming. For a rapid prototyping method a faster process of densification of the green body is desirable. Although sintering is a widely used technique in ceramic industry, the present invention also includes an alternative approach to sintering as explained in the following.

A novel alternative approach according to the present invention involves coalescing via atomic layer deposition (ALD) of the green body. In contrast to the conventional method, coalescing via ALD avoids the problem of shrinkage faced in sintering.

ALD involves a self-limiting precipitation from the gas phase in a relatively low temperature process that enables deposition of thin films of a substance. In this process, at temperatures between room temperature and about 300° C., self-limited layers from the gas phase are deposited on a surface and, therefore, this process is suitable for elimination of the open porosity of the green body without shrinkage and temperature treatment.

When the deposited material and the green body are the same, by re-enforcing the bonds between the particles, the layer created via ALD could provide sufficient densification in order to eliminate the need for further sintering. Alternatively, by using ALD as an intermediate step in order to decrease the porosity of the green body via ALD already before sintering, it is possible to considerably reduce the shrinkage of the green body due to the sintering step.

In the case of a different composition between green body and ALD-deposited material, the 3D-printing in combination with the ALD-based filling of the pores, would result in a composite material. Besides a composite of different oxides (e.g. $Al_2O_3$ for the green body and $ZrO_2$ for the ALD), one could, e.g., obtain a metal-dielectric composite via a combination of a 3D-printed dielectric material and a metal deposited via ALD (e.g. $SiO_2$ for the green body and Cu for the ALD).

As mentioned above, in the process of the present invention an electrical discharge is applied to an electrostatically stabilised suspension of particle. Due to charge neutralisation on the surface of the particles the suspension collapses and forms a green body.

Said electrical discharge takes place in a gaseous medium present above the surface of the suspension. Principally, the gaseous medium may be any ionisable gas or mixture of gases. Preferably, the gaseous medium is selected from the group comprising air, Xe, Ar, $O_2$, air with additional components such as $CCl_4$ or $CH_3I$, or mixtures thereof.

In the simple case of a free arc discharge between a contactless electrode and the suspension, the arc discharge follows the path of least energy to the surface, with its final position on the surface being less localised. This approach is especially useful for rapid prototyping where no restrictions on spatial resolution are given.

However, by guiding the discharge to a particular target point, it is possible to strongly improve the resolution of the writing process and to eliminate the irregularities caused by a free arc discharge.

Therefore, in one preferred embodiment of the invention, the charge injector includes a discharge electrode and the localized discharge between the charge injector and the suspension is induced at a predetermined position and time by irradiation with air-ionizing radiation. More specifically, said irradiation is effected by means of electromagnetic radiation, in particular laser light.

By focusing an air-ionizing radiation, in particular laser radiation, near the surface (no contact with material, so it is different from the normal laser-based 3D-printing) and creating a small plasma channel, i.e. a channel of ionized atmosphere at or on top of the surface of the suspension, the arc discharge follows the plasma channel, with its position at the surface being overlapped with the laser focus point, i.e. the point of highest ionization (FIG. 1, left).

In preferred embodiments, said irradiation is triggered in dependency on the distance between the tip of the discharge electrode and the surface of the suspension and/or the electric field strength between the electrode and surface of the suspension.

The gaseous medium which is present above the surface of the suspension and is ionized in order to produce the electrical discharge may be selected from any ionisable gas, preferably the group comprising air, Xe, Ar, or $O_2$ with additional components such as $CCl_4$ or $CH_3I$, or mixtures thereof, and is typically normal air.

The laser irradiation may be effected, e.g., for a time period in the range from 5 fs to 100 ns and at a peak energy density higher than 0.1 $TW/cm^2$ for ionisation of air. The peak intensity needed for the ionisation is mainly dependent on the specific gas to be ionised and the gas parameters. If the gas atmosphere above the suspension comprises a gas which is easy to ionise (such as Xe and $CH_3I$) the energy density may also be below the above lower limit, e.g. above 10 $GW/cm^2$.

For example, commercially available lasers for air ionisation can have from 100 mJ pulse energy with 100 ns pulses or 10 fs with 10 µJ pulse energy and may be used in the present invention.

A short pulse is usually preferred, because the ionisation limit is reached without bringing a lot of energy into the slurry. On the other hand a short pulse laser is expensive. So it is a trade-off between laser costs (higher if the pulse is shorter) and average power laser costs (higher if the average power of the laser is higher).

In another preferred embodiment of the invention, the charge injector includes a source of charged particles and step b) comprises directing the charged particles by a transportation and targeting means, e.g. a hollow capillary or an electrostatic or magnetic lens, to a predetermined position on the surface of the stabilized suspension of particles (FIG. 1, right).

In this case a stream of positively/negatively charged particles (depending on the surface charge of the particles in the suspension), with appropriate energies to overcome the gap between the source and the suspension surface, is directed to a desired point on the surface. This can be done via electrostatic lenses, a dielectric wave-guide such as a glass capillary, or utilizing magnetic fields similar to what is used in TV tubes. The resolution of the writing process can be tuned by varying the spot size or the energy of the particles, although fundamentally this is limited by the size of the particles in the suspension.

The charged particles, such as ions or electrons, typically have energies in the range from 2 KeV to 10 MeV and may be selected and used as appropriate by any skilled person in the art. e.g., for $H^+$ particles 600 keV are required to overcome 1 mm air. The emission of secondary electrons after the impact of high energy ions to the surface may also result in positive charge in the suspension. This supports the precipitation of negatively charged particles.

This alternative approach enables to achieve an even better resolution than the first approach and does not require a plasma-guided discharge.

In a preferred embodiment of the invention, the 3-dimensional body is formed using a technique of layer-by-layer deposition.

In this embodiment, initially a primary layer of aggregated particles having predetermined dimensions in the x, y and z directions is formed after steps b) and c) and further layers with predetermined dimensions are deposited successively on each other (layer-by-layer deposition) by repetition of steps b) and c).

There are at least 2 principal ways to realise this layer-by-layer (L-b-L) precipitation:

a) After a layer of the green body is precipitated the entire green body is immersed (in the z-direction) into the suspension. A readjustment of the discharge source is not needed in this case, but the mechanics for moving the green body need to be at least partially in the suspension.

b) The suspension level is increased as the layer height is increased. In this case, an additional amount of the suspension is added to the container. If the container is fixed in its position, a readjustment of the discharge source is needed. If this is not desirable one could shift the position of the vessel containing both the suspension and already printed layers in the z-direction to bring the surface of the suspension to the desired position to repeat the 2-dimensional writing process.

More specifically, in one preferred embodiment of option a) the position of the vessel and of the discharge source are, maintained and the green body is shifted downwards. In a preferred embodiment of option b), the position of the vessel and of the green body are maintained and the discharge source and the suspension level are shifted upwards.

Suitable devices for performing the process of the invention, in particular by using L-b-L techniques, represent a further aspect of the invention and are described below.

The particles forming the stabilized suspension are not especially limited and may be any organic particles, e.g. polymer particles, or inorganic particles, including metal particles, capable to form such an electrostatically stabilized suspension.

However, since a major aim of the present invention is the provision of means for preparing improved vitreous and ceramic bodies, these particles are preferably inorganic particles, in particular selected from those materials which are known components of glasses or ceramics.

More specifically, the material(s) of the particles are selected from the group comprising $SiO_2$, glasses, oxides, such as $TiO_2$, $Al_2O_3$, $MgAl_2O_4$, $ZrO_2$, $PbZrO_3$, $HfO_2$, carbides, such as SiC, nitrides such as AlN, $Si_3N_4$, or mixtures thereof.

Typically, the particles constituting the suspension have a mean diameter in the range from 4 nm to 200 µm.

These particles may have a positive or negative surface charge, which is typically imparted by a charged or ion-providing compound or material, such as an ionic compound or a cationic or anionic component thereof, coupled to the surface of said particles via covalent or non-covalent interactions.

The charged or ion-providing compound or material is nor especially limited and may be any material which is able to provide charged molecules or ions, in particular in an aqueous milieu, and capable to be coupled to the surface of said particles via covalent or non-covalent interactions.

For example, the charged material may be selected or derived from the group comprising ammonia, ammonium compounds, such as tetramethylammonium hydroxide, tetraethylammonium hydroxide, an inorganic basic compound, such as NaOH, KOH, or an acidic compound, such as HCl or citric acid or ions thereof.

Also, the particles and/or the suspension of particles may comprise(s) dopants, in particular selected from known dopants for glasses or ceramics. More specifically, the dopants may be selected from the group comprising metal oxides, such as $ZrO_2$, MgO, $Er_2O_3$, or metal ions, e.g. $Er^{3+}$, $Nd^{3+}$, $Yb^{3+}$.

The liquid forming the suspension of particles may be an aqueous medium or any other medium which is removable from the green body by evaporation or decomposition at temperatures lower than the sintering temperature.

In particular, the suspension-forming liquid may comprise dissolved salts, such as $HAuCl_4$, dopants, colouring ions like $Ni^{2+}$ and $Co^{2+}$, laser active ions ($Er^{3+}$, $Nd^{3+}$, $Yb^{3+}$), and other components which do not disturb the electrostatic stabilisation of the suspension in a critical way.

A more specific embodiment of the invention relates to a process as outlined above, wherein one or more of the following conditions are met:
the position of the charge injector relative to the suspension is adjusted by mechanical motions in the x, y, and/or z directions, the position of a vessel comprising the suspension of particles is adjusted relative to the charge injector by mechanical motions in the x, y and/or z directions, the position of the surface of the suspension and/or the formed aggregate(s) of particles or green body relative to the charge injector is adjusted in the z direction by shifting the liquid level of the suspension in the vessel or by mechanically moving the formed aggregate(s) of particles or green body in the vessel in z direction.

Advantageously, the implementation of all these conditions is amenable to automatic operation and in particular may be computer-controlled.

Consequently, in a further specific embodiment of this process i) the motions of the charge injector, the vessel, the suspension and/or the forming green body, and/or ii) the localized electrical discharge between the suspension of particles and the charge injector which is induced by either electromagnetic irradiation or a beam of charged particles, are controlled by means a software program.

A closely related aspect of the invention is a device, in particular for performing the process as described above, which comprises at least the following components:

a vessel for receiving an electrostatically stabilized suspension of particles, a charge injector, in particular including one or more electrodes or a source of high-energy charged particles, means for moving the electrode and/or the vessel in the x, y and z directions, a counter electrode arranged in the vessel for an electrical contact with the suspension of particles (or removing the excess charge when irradiating with a stream of charged particles), one or more sensors for determining geometrical and physical parameters within said vessel.

This device may further comprise a means for directing a beam of gas-ionizing radiation, in particular a beam of electromagnetic radiation, such as laser beam, to a predetermined position within the vessel, means for adjusting the level of a suspension comprised in said vessel and/or means for moving a solid body within said vessel.

The geometrical and physical parameters within said vessel may for example represent distances between different objects in said vessel, values of electrical field strength, charge, optical properties of objects, the position of the focus of a beam of electromagnetic radiation such a laser beam above the suspension, etc.

In a typical specific embodiment of said device, the vessel contains an electrostatically stabilized suspension of particles, and the charge injector includes a discharge electrode or a plurality of discharge electrodes which is/are not in contact with the suspension of particles.

A further aspect of the present invention relates to the 3-dimensional (green) body, in particular vitreous or ceramic body, obtainable by the methods as outlined below.

In contrast to cross-linking of polymers utilised as a binding mechanism for ceramic/glassy powders in the prior art where the content of the organic binding material is high (amounting to minimal 10 to 20 vol. % of the ceramic/glassy green body), the organic content in a green body obtained by the claimed method, mainly from the chemical used for electrostatic stabilisation of the suspension, is either extremely low (typically less than 5% or 1%, or even amounting to less than approximately 0.1 vol. % of the green body) or none, depending on the chemical used (which may be for example $NH_3$, which is non-organic).

Moreover, in contrast to cross-linked polymers, where the presence of the organic material in the final green body is essential for the 3D-printing, in the present method, the added chemical can easily evaporate before the sintering process starts and hence does not disturb the sintering process by contamination of pyrolysis products or gas inclusions originated from the decomposition of organic additives. More specifically: polymerized and cross-linked polymers do not evaporate, they undergo a pyrolysis at elevated temperatures; However, small molecules used in the present method evaporate without residual carbon, especially if they do not contain the element carbon.

In a specific embodiment, the initial 3-dimensional body or green body which is obtainable by the process according to the present invention is characterized in that it exhibits:

low content of organic additives, in particular below 5 weight %, preferably below 1 weight %, such as about 0.1% or 0%, of the total weight of said 3-dimensional body high green density of more than 40% arbitrary shape mechanical stability, in particular fracture strength under conditions of pressure of at least 1 MPa, preferably at least 2 MPa.

The high mechanical stability of this 3-dimensional body enables the successful transfer to and further treatment in a sintering furnace/an ALD reactor.

A further treatment of this green body may for example comprise the step of subjecting the green body to a heat treatment at a predetermined temperature of higher than 300° C. or (for sintering) of at least 1000° C., for a predetermined period of time (typically in the range from minutes to hours, such as 1-10, 1-20 or 1-30 h), optionally in the presence of oxygen. Such a heat treatment of the green body in the presence of oxygen results in a complete or partial pyrolysis of any present organic components. Alternatively, removal of the organic components is also possible by adding gases (such as $Cl_2$, $SF_6$ etc.), which are capable to react with the organic components and form volatile products in the course of said heat treatment.

Optionally, the above heat treatment may be also effected under conditions of elevated pressure, such as up to 200 MPa. Such conditions promote the elimination of residual pores.

Consequently, a further aspect of the present invention relates to a process including this step and to the resulting 3-dimensional body, in particular a vitreous or ceramic body, which is characterized by a low content of pyrolysis products, in particular below 5 weight %, such as about 0.1% or 0%, of the total weight of said 3-dimensional body.

BRIEF DESCRIPTION OF THE DRAWINGS

FIG. 1, left, shows a device including a contact-less discharge electrode and a laser for initiating a laser-guided electrical plasma discharge; FIG. 1, right, shows a device including a hollow capillary for directing a beam of charged particles to the suspension.

Figure 1:
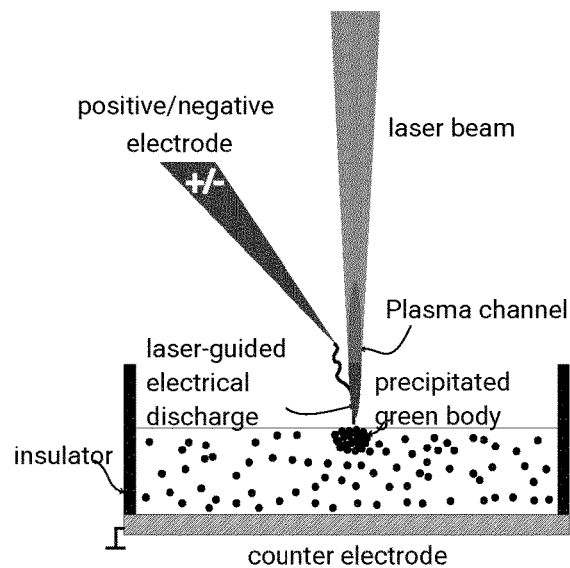
FIG. 1 schematically illustrates two principal approaches for implementing the present invention.
Figure 1:
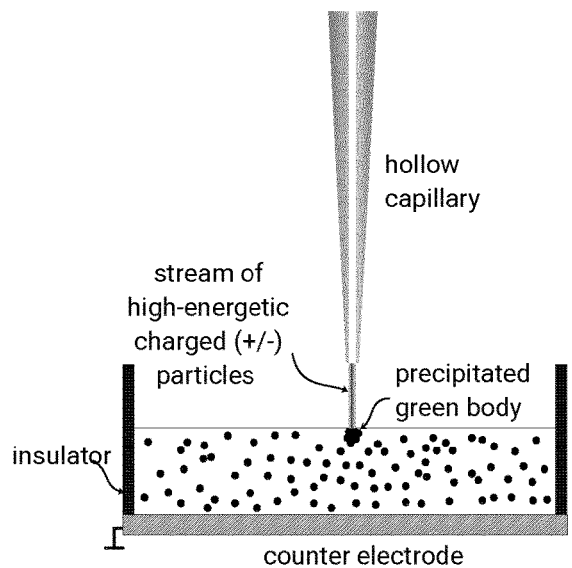
Figure 2:
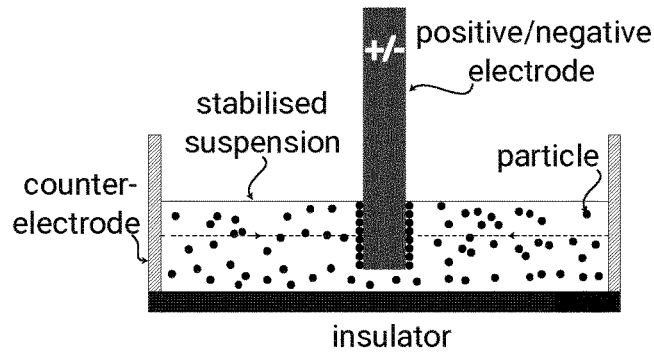
FIG. 2 schematically illustrates a device of the prior art for electrophoretic deposition.
Figure 3:
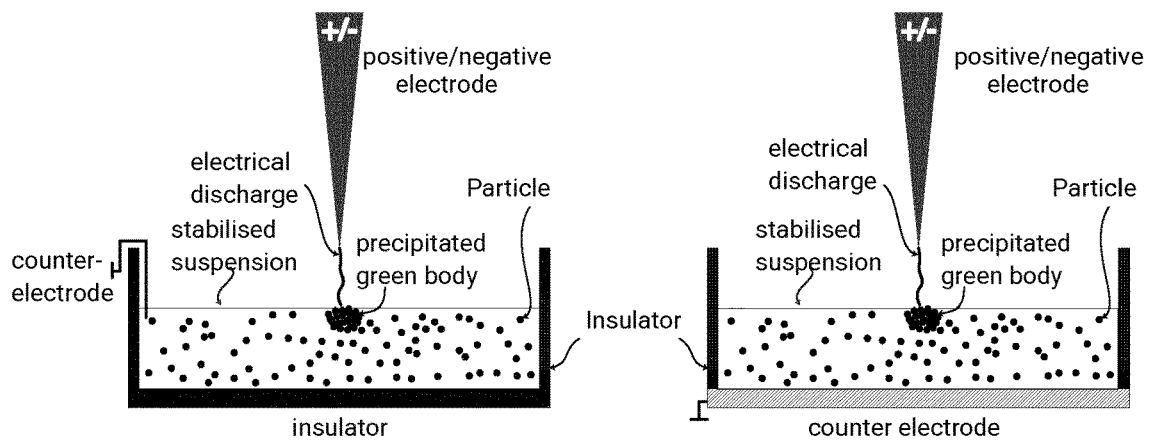
FIG. 3 shows 2 different arrangements for the counter electrode in a device according to the present invention.
Figure 4:
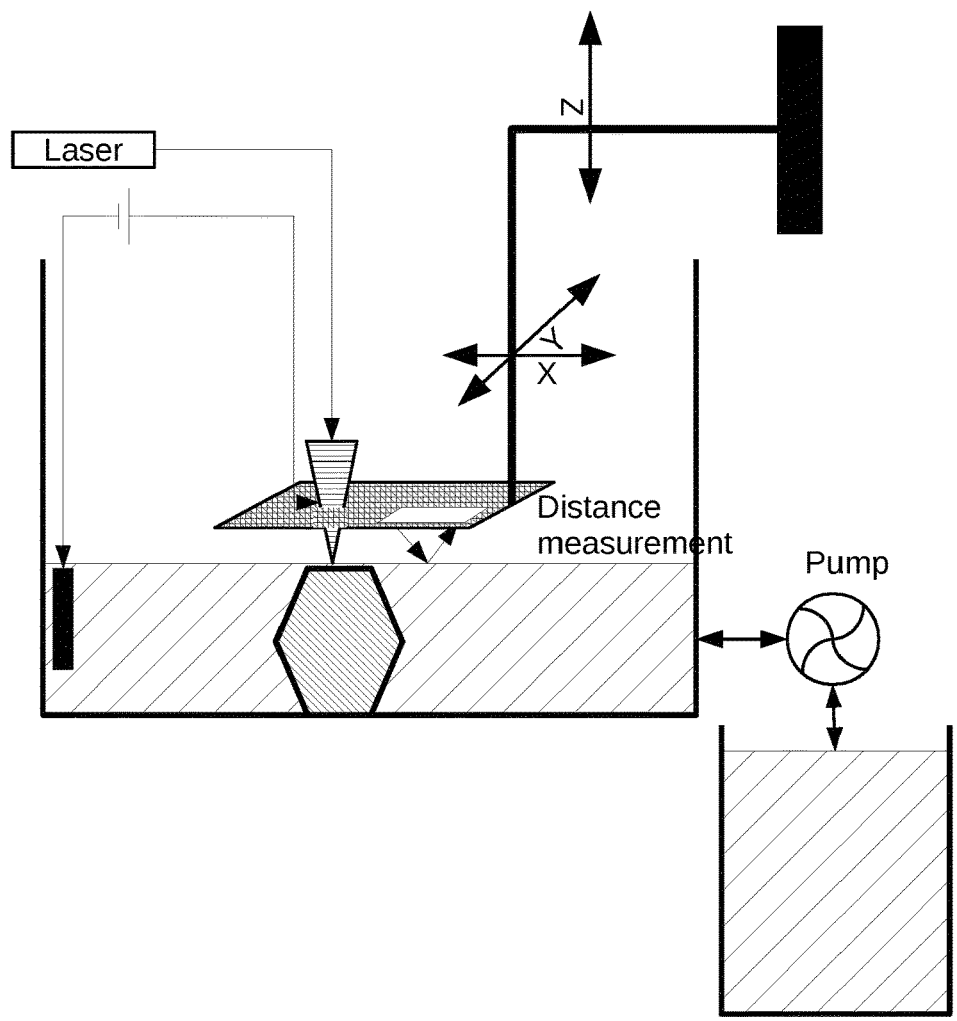
FIG. 4 schematically illustrates a device comprising a discharge electrode and a laser, wherein the position of the surface of the suspension is adjusted in the z direction by shifting the liquid level of the suspension in the vessel using a pump.
Figure 5:
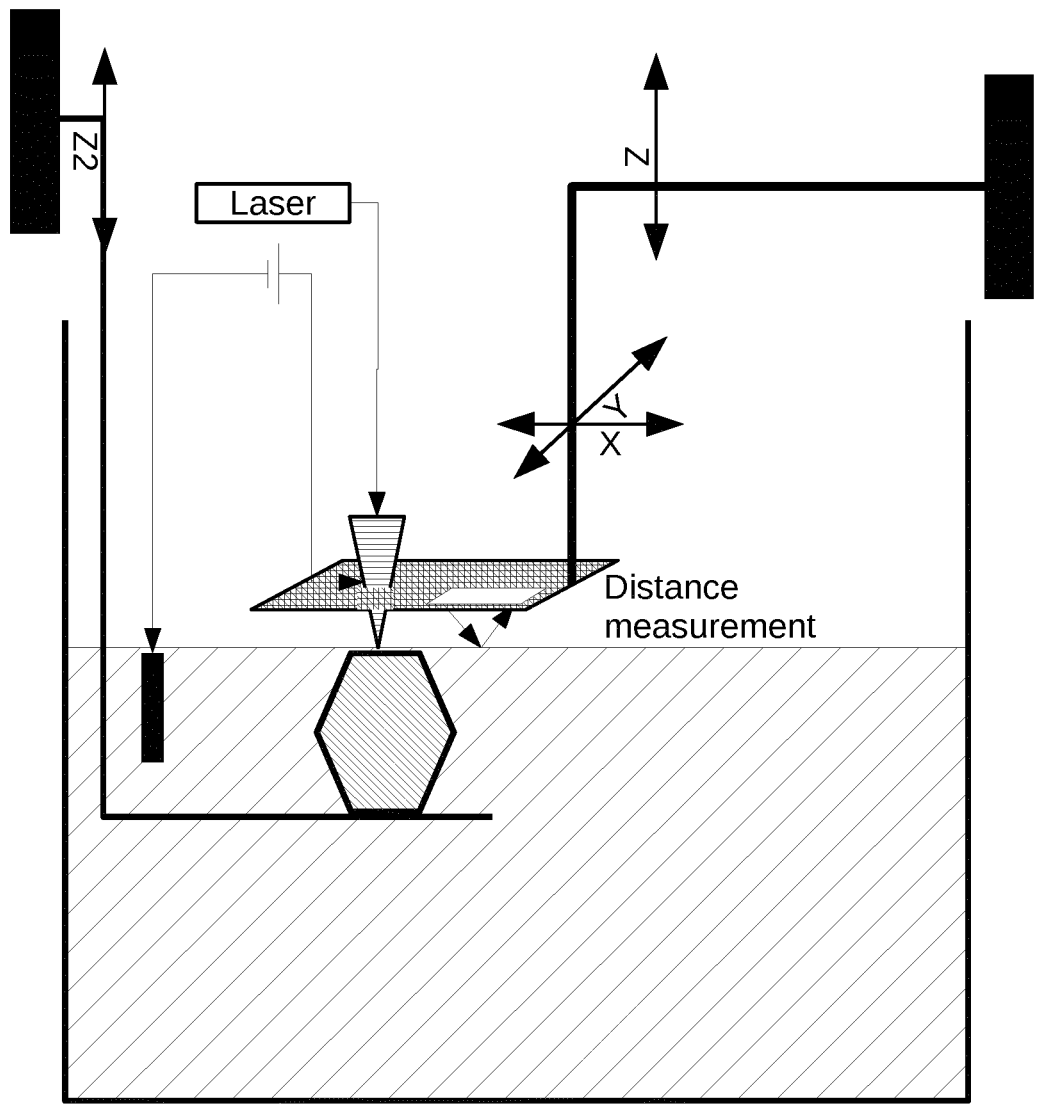
FIG. 5 schematically illustrates a device comprising a discharge electrode and a laser, wherein the formed green body is moved in the vessel in z direction.
Figure 6:
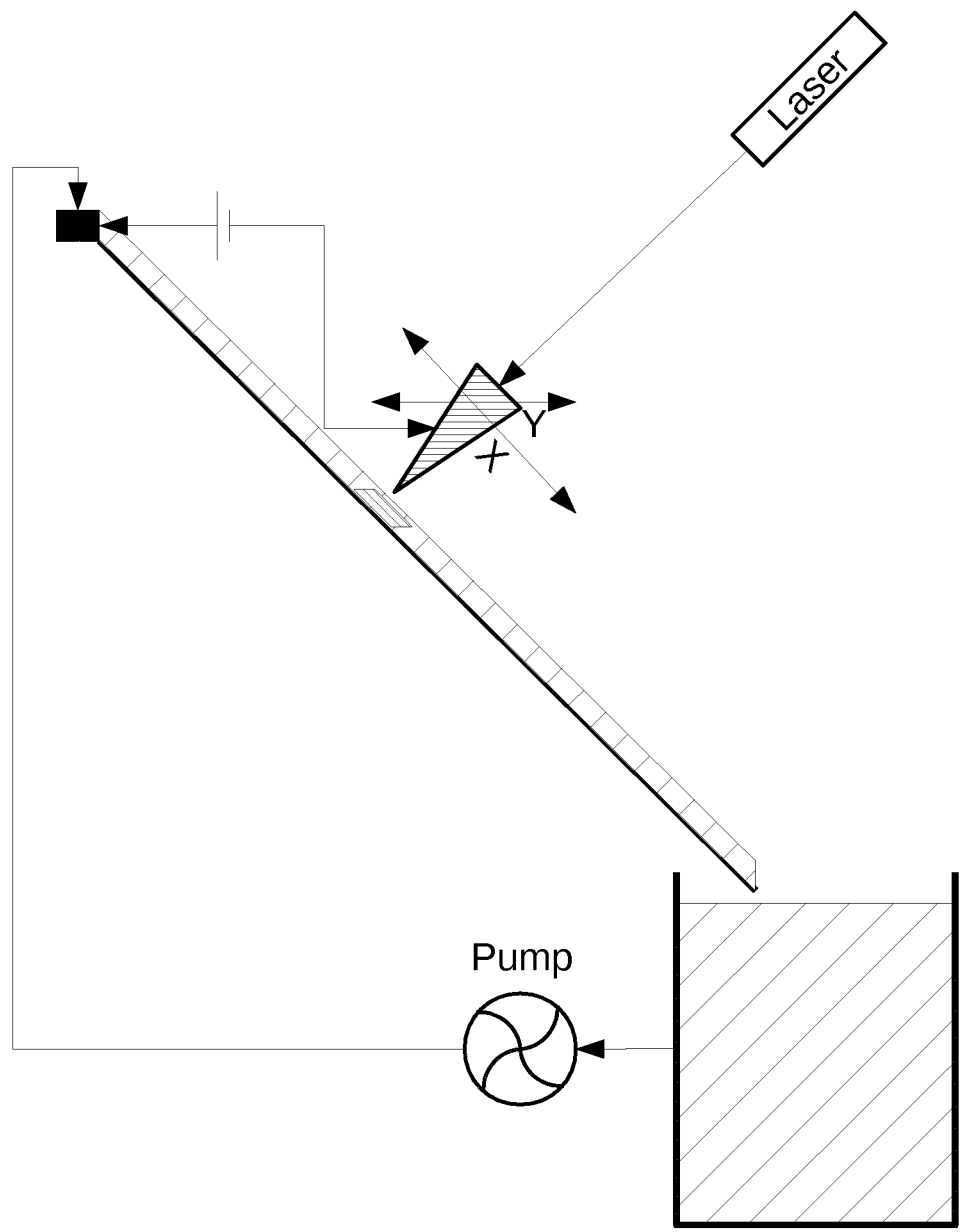
FIG. 6 schematically illustrates a device comprising a discharge electrode and a laser, wherein a suspension film is generated on a sloped substrate surface by a pump-driven suspension flow over said surface.
Figure 7:
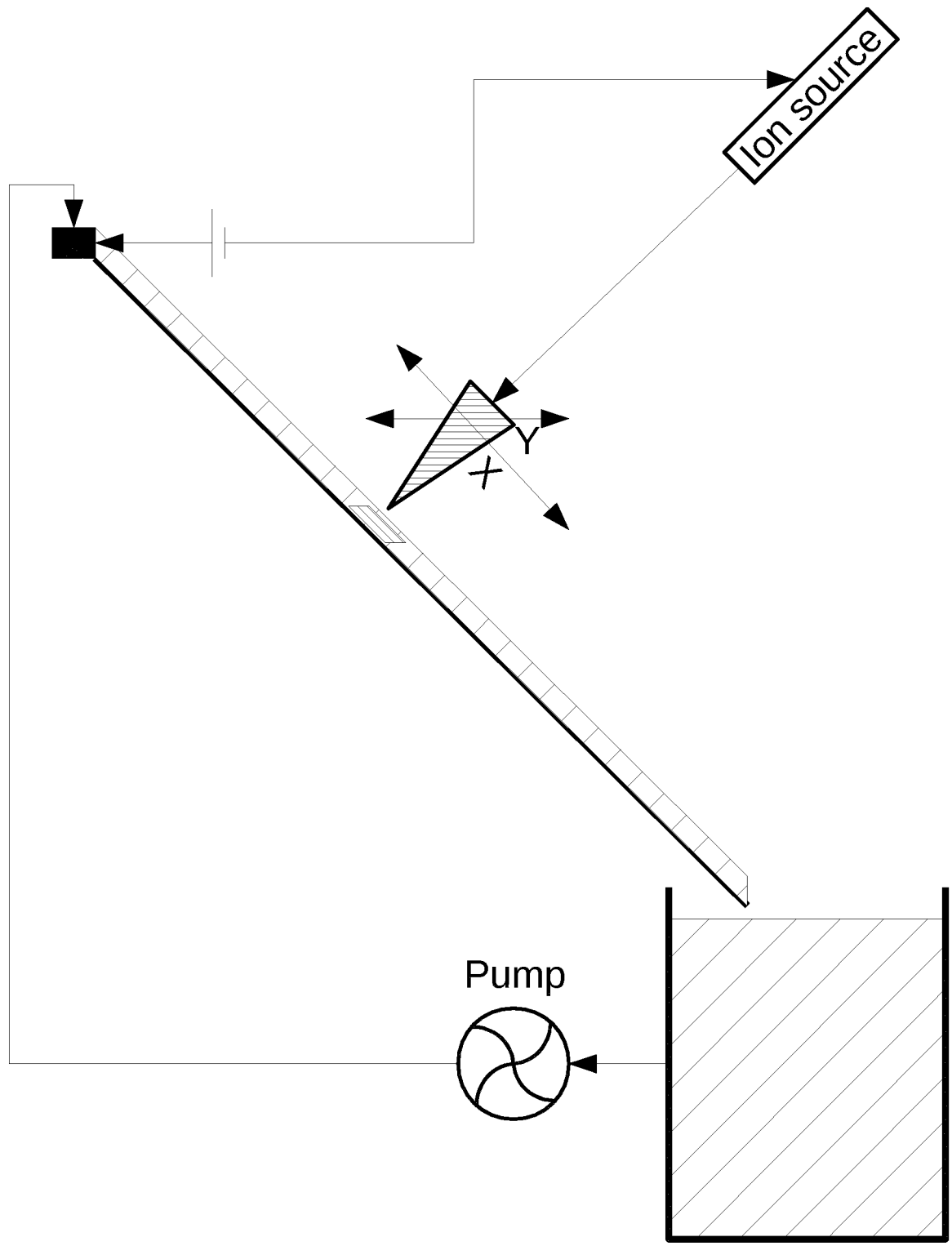
FIG. 7 schematically illustrates an arrangement analogous to that of FIG. 6, with a device wherein the discharge electrode and a laser is replaced by an ion source.

The following examples illustrate the invention in more detail.

Example 1

An exemplary green body was prepared by the process of the present invention as follows:

1. Preparation of a $SiO_2$ Slurry:
   35 g of colloidal silica 50 nm from Evonic
   1 g 35% tetramethylammoniumhydroxid solution in methanol
   60 g distilled water
   Shaking for 1 h in a PE bottle.
   This procedure results long term stable slurry.
2. Preparation of a Green Body:
   A cylindrical glass vessel having a diameter of 60 mm and a height of 40 mm is filled with the slurry in that way that the bottom is covered fully.
   The vessel is placed on a rotation stage and is connected with a wire on from the top.
   A tungsten wire (discharge electrode) is placed with one end over the slurry, the distance is 3 mm.
   The rotation stage is switched on, the rotation velocity is 1 turn per 2 min.
   A high voltage is applied between the connection of the slurry (−) and the tungsten wire (+) until a discharge is visible and the noise of the spark can be observed. The needed voltage depends on several experimental parameters, 1 kV is a common value. The voltage remains switched on until a full turn of the rotation stage is done.
   The first layer of a cylinder is precipitated.
   The process is repeated as often as desired.
   Here no laser guidance of the precipitation was used.

Example 2

An exemplary green body was densified by the ALD process of the present invention as follows:

The green body from the precipitation is dried in air at room temperature for 3 days.
The green body is heat-treated in a rapid annealing furnace under Ar at 850° C. for 20 min
The sample is transferred into an ALD machine at 200° C. using a BENEQ TFS200 ALD, trimethyl aluminium ($Al(CH_3)_3$) and DI $H_2O$ were used as precursors.
A calibrated number of cycles were used to precipitate 100 nm $Al_2O_3$,
The resulting was not shrunk to such an extent that it could be measured with a slide caliper.
The mechanical properties was tested qualitatively. The pressure required to crack the body is considerably higher after the ALD.

Example 3

Characterization of an exemplary green body obtained by the claimed process:

Density Measurement:
Geometrical measurement of the volume and measurement of the weight with a balance: 50-60% as compared to compact glassy $SiO_2$ Microporosity:
Measured with an Xray microscope (Zeiss Versa)
Results: self-produced slurry 2.8 vol % bubbles having a diameter larger than 2 µm commercial slurry: 0.5 vol % bubbles having a diameter larger than 2 µm Nanoporosity:
Electron micrograph of a fresh crack: the spheres are dense packed, between 40 and 60 vol % spheres. Internal cracks in the material are very rare.

The invention claimed is:

1. A process for preparing a 3-dimensional vitreous or ceramic body, which comprises at least the following steps:
   a) providing an electrostatically stabilized suspension of particles;
   b) effecting a local destabilization of the suspension of particles by a localized electrical discharge between a charge injector and the suspension at a predetermined position and causing an aggregation and precipitation of the particles at said position;
   c) repeating step b) at different positions and causing a formation of larger aggregates until a final aggregate of particles representing the 3-dimensional body having predetermined dimensions has been formed;
   wherein the charge injector includes i) at least one discharge electrode which does not contact said suspension of particles or ii) a source of charged particles.

2. The process according to claim 1, further comprising at least the following step
   d) densifying said 3-dimensional body.

3. The process according to claim 2, wherein step d) is effected by sintering and/or atomic layer deposition (ALD) of a filling material in pores of said 3-dimensional body.

4. The process according to claim 1, wherein the electrical discharge takes place in a gaseous medium which is selected from the group consisting of air, Xe, Ar, $O_2$, air containing $CCl_4$, air containing $CH_3I$, and mixtures thereof.

5. The process according to claim 1, wherein the charge injector includes a discharge electrode and the localized electrical discharge between the charge injector and the suspension is induced at a predetermined position and time by irradiation with air-ionizing radiation.

6. The process according to claim 5, wherein the irradiation is effected by laser light.

7. The process according to claim 5, wherein the irradiation is triggered in dependency on a distance between a tip of the discharge electrode and a surface of the suspension and/or an electric field strength between the electrode and surface of the suspension.

8. The process according to claim 6, wherein a laser irradiation is applied for a time period in a range from 5 fs to 100 ns and at a peak energy density of higher than 0.1 $TW/cm^2$.

9. The process according to claim 1, wherein the charge injector includes a source of charged particles and step b) comprises directing the charged particles by a transportation and targeting means to a predetermined position on a surface of the stabilized suspension of particles.

10. The process according to claim 1, wherein the charged particles have energies in a range from 2 keV to 10 MeV.

11. The process according to claim 1, wherein initially a primary layer of aggregated particles having predetermined dimensions in x, y and z directions is formed after steps b) and c) and further layers with predetermined dimensions are deposited successively on each other in a layer-by-layer deposition by repetition of steps b) and c).

12. The process according to claim 1, wherein the particles are inorganic particles selected from the group consisting of $SiO_2$, glasses, $TiO_2$, $Al_2O_3$, $MgAl_2O_4$, $ZrO_2$, $PbZrO_3$, $HfO_2$, carbides, nitrides and mixtures thereof.

13. The process according to claim 1, wherein the particles constituting the suspension have a mean diameter in a range from 4 nm to 200 μm.

14. The process according to claim 1, wherein the particles have a positive or negative surface charge imparted by a charged compound or material coupled to a surface of said particles via covalent or non-covalent interactions.

15. The process according to claim 14, wherein the charged compound or material is selected or derived from the group consisting of ammonia, ammonium compounds, an inorganic basic compound, an acidic compound, and ions thereof.

16. The process according to claim 1, wherein the particles and/or the suspension of particles comprise(s) dopants selected from the group consisting of metal oxides and metal ions.

17. The process according to claim 1, wherein the liquid forming the suspension of particles is an aqueous medium or any other medium which is removable from the 3-dimensional body preferentially by evaporation.

18. The process according to claim 1, wherein one or more of the following conditions are met:
a position of the charge injector relative to the suspension is adjusted by mechanical motions in x, y and/or z directions,
a position of a vessel comprising the suspension of particles is adjusted relative to the charge injector by mechanical motions in the x, y and/or z directions,
a position of a surface of the suspension and/or the aggregate(s) of particles or 3-dimensional body relative to the charge injector is adjusted in the z direction by shifting a liquid level of the suspension in the vessel or by mechanically moving the formed aggregate(s) in the vessel in the z direction.

19. The process according to claim 18, wherein
i) the motions of the charge injector, the vessel, the suspension and/or the forming 3-dimensional body, and/or
ii) the localized electrical discharge between the suspension of particles and the charge injector, which is induced by either irradiation with air-ionizing radiation, are controlled by a software program.

20. A device for performing a process for preparing a 3-dimensional vitreous or ceramic body, said device comprising at least the following components:
a vessel for receiving an electrostatically stabilized suspension of particles,
a charge injector including one or more electrodes or a source of high-energy charged particles,
means for moving the one or more electrodes and/or the vessel in x, y and z directions,
a counter electrode arranged in the vessel for contact with the suspension of particles, and
one or more sensors for determining geometrical and physical parameters within said vessel,
wherein the process comprises at least the following steps:
a) providing an electrostatically stabilized suspension of particles;
b) effecting a local destabilization of the suspension of particles by a localized electrical discharge between a charge injector and the suspension at a predetermined position and causing an aggregation and precipitation of the particles at said position;
c) repeating step b) at different positions and causing a formation of larger aggregates until a final aggregate of particles representing the 3-dimensional body having predetermined dimensions has been formed;
wherein the charge injector includes i) at east one discharge electrode which does not contact said suspension of particles or ii) a source of charged particles.

21. The device according to claim 20, further comprising a means for directing a laser beam to a predetermined position within the vessel.

22. The device according to claim 20, further comprising means for adjusting a level of a suspension comprised in said vessel and/or means for moving a solid body within said vessel.

23. The device according to claim 20, wherein the geometrical and physical parameters within said vessel represent distances between different objects in said vessel, values of electrical field strength, charge, and optical properties of the different objects in said vessel.

24. The device according to claim 20, wherein
the vessel contains an electrostatically stabilized suspension of particles, and
the charge injector includes a plurality of discharge electrodes which is/are not in contact with the suspension of particles.

25. The process according to claim 3, wherein the deposited filling material is selected from the group consisting of glasses, ceramics and metals and wherein the atomic layer deposition comprises at least the following steps:
covering an inner surface of the 3-dimensional with a precursor of the filling material from the gas phase;
converting the precursor adsorbed at the inner surface into a non-volatile material by a chemical reaction with a component from the gas phase; and
repeating these 2 steps until the pores of the 3-dimensional body are at least partially filled with the non-volatile material.

* * * * *